United States Patent [19]

Baur et al.

[11] Patent Number: 6,083,653
[45] Date of Patent: Jul. 4, 2000

[54] CYCLOOLIGOSACCHARIDE-BORON COMPLEX

[75] Inventors: Rüdiger Baur, Eppstein; Hans-Tobias Macholdt, Darmstadt-Eberstadt, both of Germany

[73] Assignee: Clariant GmbH, Frankfurt, Germany

[21] Appl. No.: 09/039,706

[22] Filed: Mar. 16, 1998

[30] Foreign Application Priority Data

Mar. 18, 1997 [DE] Germany ............... 197 11 260

[51] Int. Cl.$^7$ .................................. G03G 9/097
[52] U.S. Cl. .................. 430/110; 430/137; 524/108; 524/183
[58] Field of Search .................... 430/110, 137; 536/103; 514/58; 524/183, 108

[56] References Cited

U.S. PATENT DOCUMENTS 5,585,216 12/1996 Baur et al. ............... 430/110
5,800,602 9/1998 Baur et al. ............... 430/110

FOREIGN PATENT DOCUMENTS 0687959 12/1995 European Pat. Off. .
0742230 11/1996 European Pat. Off. .
4321289 1/1995 Germany .
5163449 6/1993 Japan .

OTHER PUBLICATIONS

Jira, T. et al. "Chrial resoltuion of diols by capillary electrophoresis using borate–cyclodextrin complexation". Journal of Chromatography A 761, pp. 269–275, Feb. 1997.
Bhat, Shrihar et al. "Oxygenation of Alkenes with t–BuOOH Catalysed by beta–Cyclodextrin Borate" Tetrahedron Letters, vol. 37, No. 20, pp. 3581–3584, 1996.
European Search Report 98 10 4104, Feb. 1999.
XP–002086339 "Study Of Interactions In Aqueous Solutions Containing Cyclodextrin, Glucose And Borate," T.L. Paál and J. Szejtli, Acta Chim Acad. Sci. Hung., Bd. 106, Nr. 1, 1981, pp. 9–15.
XP–002085983 "Oxygenation of Alkenes with t–BuOOH Catalysed by β–Cyclodextrin Borate," S. Bhat and S. Chandrasekaran, Tetrahedron Letters, vol. 37, No. 20., 1996, pp. 3581–3584.
H.–T. Macholdt, A. Sieber, "Changing Effects of Organic Pigments in Electrophotographic Toners;" Dyes & Pigments 9 (1988), 119–127.
Y. Higashiyama et al. (J. Electrostatics 30 (1993) 203–212).
A. Singewald, L. Ernst, Zeitschrift für Physikal. Chem. Neue Folge, vol. 124 (1981) 223–248.
Beilstein Hanbuch der Organischen Chemie; Syst. No. 3011, 5th suppl. vol. 19 part 12.
Saenger, Angew. Chem. 92 (1980) 343–361.
D. French, M. L. Levine, J. H. Pazur, E. Norberg J. Am. Chem. Soc. 71 (1949) 353–358.

Primary Examiner—Christopher D. Rodee
Attorney, Agent, or Firm—Susan S. Jackson; Scott E. Hanf

[57] ABSTRACT

Cyclosaccharide-boron complexes consisting of 1 to 4 cyclodextrin units and one borate radical of the formula (I):

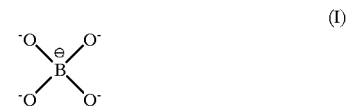

have good charge control properties and lend themselves excellently to dispersion in toner, powder coating and electret binders.

7 Claims, No Drawings

CYCLOOLIGOSACCHARIDE-BORON COMPLEX

The present invention is within the technical field of charge control agents in toners and developers for electrophotographic recording processes, in powders and powder coatings for surface coating, in electret materials, especially in electret fibers, and in separation processes.

In electrophotographic recording processes a latent charge image is produced on a photoconductor. This latent charge image is developed by applying an electrostatically charged toner which is then transferred to, for example, paper, textiles, foils or plastic and is fixed by means, for example, of pressure, radiation, heat or the action of solvent. Typical toners are one- or two-component powder toners (also known as one- or two-component developers); also used are specialty toners, such as magnetic toners, liquid toners or polymerization toners, for example. By polymerization toners are meant those toners which are formed by, for example, suspension polymerization (condensation) or emulsion polymerization and lead to improved particle properties in the toner. Also meant are those toners produced in principle in nonaqueous dispersions. (L. B. Schein, "Electrophotography and Development Physics"; Springer Series in Electrophysics 14; Springer-Verlag, 1988).

One measure of the quality of the toner is its specific charge q/m (charge per unit mass). In addition to the sign and level of the electrostatic charge, the principal, decisive quality criteria are the rapid attainment of the desired charge level and the constancy of this charge over an extended activation period. In addition to this, the insensitivity of the toner to climatic effects such as temperature and atmospheric humidity is a further important criterion for its suitability.

Both positively and negatively chargeable toners are used in copiers and laser printers, depending on the type of process and type of apparatus.

To obtain electrophotographic toners or developers having either a positive or negative charge, it is common to add charge control agents. Since the charge of toner binders is in general heavily dependent on the activation period, the function of a charge control agent is, on the one hand, to set the sign and level of the toner charge and, on the other hand, to counteract the charge drift of the toner binder and to provide for constancy of the toner charge.

Charge control agents which are not able to prevent the toner or developer from showing a high charge drift (aging) during a prolonged period of use, and which may even cause the toner or developer to undergo charge inversion, are hence unsuitable for practical use.

While for black toners it is possible to employ black, blue or dark charge control agents, coloristic factors demand, for color toners, charge control agents without an inherent color.

In the case of full color toners, in addition to the precisely defined requirements in terms of color, the three toners, yellow, cyan and magenta, must also be matched exactly to one another in terms of their triboelectric properties, since they are transferred in succession in the same apparatus.

It is known that colorants may have a sustained effect on the triboelectric charge of toners (H.-T. Macholdt, A. Sieber, Dyes & Pigments 9 (1988), 119–127). Because of the different triboelectric effects of colorants and the resulting effect, sometimes very pronounced, on toner chargeability, it is not possible simply to add the colorants to a toner base formulation made available at the start. On the contrary, it may be necessary to make available for each colorant an individual formulation to which the nature and amount of the required charge control agent are custom-tailored.

Since this procedure is highly laborious, there is a need for highly effective, colorless charge control agents which are able to compensate for the different triboelectric characteristics of different colorants and to give the toner the desired charge. In this way, colorants which are very different triboelectrically can be employed in the various toners required (yellow, cyan, magenta and if desired black) using one and the same charge control agent, on the basis of a toner base formulation made available at the start.

Another important practical requirement is that the charge control agents should have high thermal stability and good dispersibility. Typical temperatures at which charge control agents are incorporated into the toner resins, when using kneading apparatus and extruders, are between 100° C. and 200° C. Correspondingly, thermal stability at 200° C. is a great advantage. It is also important for the thermal stability to be ensured over a relatively long period (about 30 minutes) and in a variety of binder systems. This is significant because matrix effects occur again and again and lead to the premature decomposition of the charge control agent in the toner resin, causing the toner resin to turn dark yellow or dark brown and the charge control effect to be wholly or partly lost. Typical toner resins are addition polymerization, polyaddition and polycondensation resins, such as styrene, styrene-acrylate, styrene-butadiene, acrylate, polyester and phenol-epoxy resins, and also cycloolefin copolymers, individually or in combination, which may also contain further components, examples being colorants, such as dyes and pigments, waxes or flow assistants, or may have the these components added subsequently, such as highly disperse silicas.

It is of great advantage for its good dispersibility if the charge control agent has, as far as possible, no waxlike properties, no tackiness, and a melting or softening point of >150° C., preferably >200° C. Tackiness frequently causes problems during metered addition to the toner formulation, and low melting or softening points may lead to inhomogeneous distribution during dispersion, caused by the material coalescing in drops in the carrier material.

Apart from their use in electrophotographic toners and developers, charge control agents may also be used to improve the electrostatic charge of powders and coatings, especially in triboelectrically or electrokinetically sprayed powder coatings as are used to coat surfaces of articles made from, for example, metal, wood, plastic, glass, ceramic, concrete, textile material, paper or rubber. Powder coating technology is used, for example, when coating articles such as garden furniture, camping equipment, domestic appliances, vehicle parts, refrigerators and shelving, and for coating workpieces of complex shape. The powder coating or the powder receives its electrostatic charge, in general, according to one of the two following processes:

In the corona process, the powder coating or the powder is guided past a charged corona and is charged in the process; in the triboelectric or electrokinetic process, the principle of frictional electricity is utilized.

The powder coating or the powder in the spray apparatus receives an electrostatic charge which is opposite to the charge of its friction partner, generally a hose or spray line made, for example, from polytetrafluoroethylene.

It is also possible to combine the two processes. Typical powder coating resins employed are epoxy resins, carboxyl- and hydroxyl-containing polyester resins, polyurethane resins and acrylic resins, together with the customary hardeners. Resin combinations are also used. For example, epoxy resins are frequently employed in combination with carboxyl- and hydroxyl-containing polyester resins.

Examples of typical hardener components for epoxy resins are acid anhydrides, imidazoles and dicyandiamide, and derivatives thereof. Examples of typical hardener components for hydroxyl-containing polyester resins are acid anhydrides, blocked isocyanates, bisacylurethanes, phenolic resins and melamine resins. Examples of typical hardener components for carboxyl-containing polyester resins are triglycidyl isocyanurates or epoxy resins. Typical hardener components used in acrylic resins are, for example, oxazolines, isocyanates, triglycidyl isocyanurates or dicarboxylic acids.

The disadvantage of insufficient charge can be seen above all in triboelectrically or electrokinetically sprayed powders and powder coatings which have been prepared using polyester resins, especially carboxyl-containing polyesters, or using so-called mixed powders, also referred to as hybrid powders. By mixed powders are meant powder coatings whose resin base comprises a combination of epoxy resin and carboxyl-containing polyester resin. The mixed powders form the basis for the powder coatings used most commonly in practice. Inadequate charging of the above-mentioned powders and powder coatings results in an inadequate deposition rate and inadequate flowing power on the workpiece to be coated. The term "flowing power" is a measure of the extent to which a powder or powder coating is deposited on the workpiece to be coated, including its rear faces, cavities, fissures and, in particular, its inner edges and angles.

It has additionally been found that charge control agents are able to improve considerably the charging and the charge stability properties of electret materials, especially electret fibers (DE-A43 21 289). Electret fibers have hitherto been described mainly in connection with the problem of filtering very fine dusts (e.g. from Biermann, "Evaluation of permanently charged electrofibrous filters", 17th DOE Nuclear Air Cleaning Conference, Denver, USA, (1982)). The filter materials described differ both in respect of the materials of which the fibers consist and with regard to the manner in which the electrostatic charge is applied to the fibers. Typical electret materials are based on polyolefins, halogenated polyolefins, polyacrylates, polyacrylonitriles, polystyrenes or fluoropolymers, for example polyethylene, polypropylene, polytetrafluoroethylene and perfluorinated ethylene and propylene, or on polyesters, polycarbonates, polyamides, polyimides, polyether ketones, on polyarylene sulfides, especially polyphenylene sulfides, on polyacetals, cellulose esters, polyalkylene terephthalates and mixtures thereof. Electret materials, especially electret fibers, can be used, for example, to filter (very fine) dusts. The electret materials can receive their charge in a variety of ways, for instance by corona charging or triboelectric charging.

It is additionally known that charge control agents can be used in electrostatic separation processes, especially in processes for the separation of polymers. For instance, using the example of the externally applied charge control agent triphenylammonium tetraphenylborate, Y. Higashiyama et al. (J. Electrostatics 30 (1993) 203–212) describe how polymers can be separated from one another for purposes of recycling. Without charge control agents, the triboelectric charging characteristics of low-density polyethylene (LDPE) and high-density polyethylene (HDPE) are extremely similar. Following the addition of charge control agents, LDPE takes on a highly positive and HDPE a highly negative charge, and the materials can thus be separated easily. In addition to the external application of the charge control agents it is also possible to conceive in principle of their incorporation into the polymer in order, for example, to shift the position of the polymer within the triboelectric voltage series and to obtain a corresponding separation effect. In this way it is likewise possible to separate other polymers, such as polypropylene (PP) and/or polyethylene terephthalate (PET) and/or polyvinyl chloride (PVC), from one another.

Salt minerals, for example, can likewise be separated with particularly good selectivity if they are surface-treated beforehand (surface conditioning) with an additive which improves the substrate-specific electrostatic charge (A. Singewald, L. Ernst, Zeitschrift für Physikal. Chem. Neue Folge, Vol. 124 (1981) 223–248).

Charge control agents are employed, furthermore, as electroconductivity providing agents (ECPAs) for inks in inkjet printers (JP 05 163 449-A).

Charge control agents are known from numerous literature references. However, the charge control agents known to date have a range of disadvantages which severely limit their use in practice or even, in some cases, render it impossible; examples of such disadvantages are inherent color, instability to heat or light, low stability in the toner binder, inadequate activity in terms of the desired sign of the charge (positive or negative charging), charge level or charge constancy, and dispersibility.

EP-A-0 687 959 describes cyclodextrins as charge control agents. However, these have the disadvantage of a relatively slow triboelectric chargeability.

EP-A-0 742 230 discloses cyclodextrin inclusion compounds in which various organic or inorganic molecules or else (heavy) metal ions are present in the cavity of the cyclodextrin framework. These inclusion compounds often have the disadvantage of inadequate short-term charging and, in the case of heavy metal ions, have ecological disadvantages.

The object of the present invention was thus to find improved, particularly effective, colorless charge control agents. The intention is that the compounds should not only permit the rapid attainment and constancy of the charge but should also be of high thermal stability (decomposition temperature >200° C.). Furthermore, these compounds should be readily dispersible, without decomposition, in various toner binders employed in practice, such as polyesters, polystyrene-acrylates or polystyrene-butadienes/epoxy resins and also cycloolefin copolymers. In addition, the compounds should be ecologically and toxicologically unobjectionable, i.e. nontoxic and free from heavy metals. Furthermore, their action should be independent of the resin/carrier combination, in order to open up broad applicability. They should likewise be susceptible of good dispersion, without decomposition, in common powder coating binders and electret materials, such as polyethylene-styrene (PES), epoxy-PES-epoxy hybrid, polyurethane and acrylic systems and also polypropylenes, and should not cause any discoloration of the resins.

It has surprisingly now been found that, from the multiplicity of cyclooligo-saccharides that have been described, the cyclodextrin-borate complexes, prepared for the first time, possess good charge control properties and high thermal stability. Furthermore, these compounds are without inherent color and have excellent dispersibility in different toner, powder coating and electret binders.

The present invention provides cyclodextrin-borate complexes consisting of from 1 to 4, preferably 1 or 2, cyclodextrin units and one borate radical of the formula (I):

(I)

NMR studies permit the conclusion that a borate radical of the formula (I) is linked by way of oxygen atoms in an esterlike manner with at least one cyclodextrin molecule.

The preparation of cyclodextrins is widely described in the literature (Beilstein "Handbuch der Organischen Chemie; Syst. No. 3011, 5th suppl. Vol. 19/12; Angew. Chem. 92 (1980) 343, D. French, M. L. Levine, J. H. Pazur, E. Norberg J. Am. Chem. Soc. 71 (1949) 353). In a typical variant, the cyclodextrins are synthesized by reacting starch with cultures of Bacillus macerans. The individual cyclic systems can be separated from the mixture by fractional crystallization or by chromatographic methods.

Alpha, beta and gamma cyclodextrins are known, their designation depending on the number of cyclically linked saccharide monomers. A cyclically 1,4-linked oligosaccharide consisting of 6 saccharide monomers is known as alpha-cyclodextrin, one of 7 saccharide monomers as beta-cyclodextrin and one of 8 saccharide monomers as gamma-cyclodextrin.

By cyclodextrins are meant preferably those which are obtainable commercially, examples being α-cyclodextrin, β-cyclodextrin, γ-cyclodextrin, methyl-α-cyclodextrin, methyl-β-cyclodextrin, methyl-γ-cyclodextrin, acetyl-β-cyclodextrin and acetyl-γ-cyclodextrin.

Boron compounds suitable for preparing the cyclodextrin-borate compounds of the invention are obtainable commercially, examples being orthoboric acid, boric chlorides or boric bromides, such as $BCl_3$, boric anhydride (boron oxide) or alkali metal borates such as borax.

The invention also provides a process for preparing a cyclodextrin-borate complex, which comprises reacting a cyclodextrin with one of the abovementioned boron compounds in an aqueous alkaline medium at a pH, for example, in the range between 7 and 14, preferably between 8 and 14 and, with particular preference, between 9 and 13. It is also possible to employ an aqueous-organic medium, the organic solvent preferably being a water-soluble alcohol such as methanol, ethanol or isopropanol. The amounts of organic solvent should be such that the reactants remain in solution and the liquid medium remains a single phase. Advantageous reaction temperatures are between 0 and 80° C., especially between 20 and 60° C. The molar proportions of the reactants employed, cyclodextrin and boron compound, are preferably between 1:0.1 and 1:10, preferably between 1:0.5 and 1:5 and, in particular, approximately 1:2.

From the standpoint of a high space-time yield it is judicious to conduct the reaction in a solution which is as concentrated as possible. In principle, however, it is possible to operate even in dilute solutions with a strength, for example, of 1%.

Bases used to establish the desired pH are advantageously hydroxides or alcoholates or combinations thereof, with particular preference being given to alkali metal hydroxides, such as NaOH, or alcoholates, such as Na methanolate/methanol.

The cyclodextrin-borate complexes are judiciously isolated by introduction into or addition to an excess of organic solvent, examples of which are alcohols, assisted by temperature reduction. The white precipitate which forms is filtered off and dried advantageously at temperatures between 30 and 120° C., with particular advantage between 50 and 100° C., assisted by reduced pressure. Through the drying time, temperature and reduced pressure it is possible to control the residual water content, which is between 0.1 % by weight and 25% by weight, advantageously between 3% by weight and 20% by weight.

Another suitable method of isolation is spray drying, in which case the desired compounds are obtainable without decomposition. To reduce the moisture content it is also possible to carry out subsequent drying.

It is possible, furthermore, to prepare the compounds of the invention by kneading or flushing the reactants with appropriate kneading, extruding or mixing apparatus, which involves pasting them up in an alkaline medium and carrying out intensive mixing. The water content of these resulting pastes can be between 1 and 30% by weight, preferably between 5 and 20% by weight.

The formation of the cyclodextrin-borate complexes of the invention can be demonstrated by UV spectra, NMR spectrograms, DTA and elemental analysis. The starting products, such as β-cyclodextrin and orthoboric acid, for example, show no absorption in water in the UV spectrum between 200 and 500 nm. Following the reaction, formation of a complex is evident from an absorbance band between 200 and 300 nm.

NMR spectroscopic measurements, both solid state and in condensed phase (DMSO) with HD exchange, point to a complexation and/or esterification. Furthermore, a shift in the decomposition temperature relative to pure cyclodextrins can be found by differential thermal analysis. Depending on the synthesis conditions the normal boron content found is between 0.1% and 5%, as determined by elemental analysis.

The compounds of the invention are charge control agents which can be employed with surprising diversity and can be matched precisely to the particular resin/toner system. A further factor is that the compounds employed in accordance with the invention are colorless and free-flowing and possess particularly high and constant charge control properties, good thermal stabilities and very good dispersibility. A further technical advantage of these compounds is that they are inert toward the various binder systems and can therefore be employed widely.

It is also of advantage that the synthesis of the compounds of the invention and their dispersion in the binder can be conducted in one operation. After forming a paste from the reactants they can be dispersed in the binder system using kneaders, mixers, extruders or roller beds at temperatures above the softening point, the synthesis of the compounds of the invention taking place simultaneously.

Dispersion means the distribution of one substance within another, i.e. in the context of the invention the distribution of a charge control agent in the toner binder, powder coating binder or electret material.

Depending on the specific material properties of the charge control agent, which may be crystalline, semi- or partially crystalline or amorphous under X-ray analysis, excellent dispersion means homogeneous distribution of the charge control agent within the respective binder.

It is known that crystalline substances in their coarsest form are present as agglomerates. To achieve homogeneous distribution within the binder, these agglomerates must be disrupted by the dispersing operation into smaller aggregates or, ideally, into primary particles. The particles of charge control agent present in the binder following dispersion should be smaller than 1 μm, preferably smaller than 0.5 μm, with a narrow particle size distribution being of advantage.

Depending on the energy input, substances are referred to as being of easy or difficult dispersibility. The dispersibility is closely linked with the material-specific, chemophysical properties. Determinants are structure; solid-state morphology; modification/crystallization; particle size and distribution, size determined, for example, by the BET surface area; nature and form of the surface; aftertreatment of the substance, for example milling, drying; finish or surface covering.

For the dispersion of a charge control agent, easy dispersibility means that the charge control agent particles can easily be disrupted by mechanical forces (for example by extrusion, kneading); that the charge control agents are wetted equally well by the binder in their disrupted and undisrupted form; that the charge control agent particles in their disrupted form are homogeneously distributed, i.e. distributed with statistical uniformity over all volume elements of the binder; and that this state of homogeneous distribution is retained and is not subsequently altered in the binder by migration or recrystallization effects.

For the particle size, defined by the $d_{50}$ value, there are optimum ranges of effectivity depending on the material. For example, coarse particles (~1 mm) can in some cases not be dispersed at all or can be dispersed only with a considerable investment of time and energy, whereas very fine particles in the submicron range harbor a heightened safety risk, such as the possibility of dust explosion.

The particle size and form is established and modified either by the synthesis and/or by aftertreatment. The required property is frequently possible only through controlled aftertreatment, such as milling and/or drying. Various milling techniques are suitable for this purpose. Examples of advantageous technologies are air jet mills, cutting mills, hammer mills, bead mills and impact mills.

The binder systems mentioned in the present invention are, typically, hydrophobic materials. High water contents in the charge control agent can either oppose wetting or else promote dispersion (flushing). The practicable moisture content is therefore specific to the particular material.

The compounds of the invention feature the following chemicophysical properties: The water content, determined by the Karl-Fischer method, is between 0.1% and 30%, preferably between 1 and 25% and, with particular preference, between 1 and 20%, it being possible for the water to be adsorbed and/or bonded and for its proportion to be adjusted by the action of heat at up to 200° C. and reduced pressure up to $10^{-8}$ torr or by addition of water.

The particle size, determined by means of evaluation by light microscope or by laser light scattering and defined by the $d_{50}$ value, is between 0.01 μm and 1000 μm, preferably between 0.1 and 500 μm and, with very particular preference, between 0.5 and 250 μm.

It is particularly advantageous if milling results in a narrow particle size. Preference is given to a range $\Delta(d_{95}-d_{50})$ of less than 500 μm, in particular less than 200 μm.

The crystallinity of the compounds, determined by the X-ray diffraction method, is highly crystalline to partly crystalline, and is recognisable by pronounced reflections in the X-ray diffraction diagram recorded with values of 2 theta in the range from 2 to 41.

Particularly preferred cyclodextrin-borate complexes are those having a specific breakdown resistance, determined at 1 kHz, of between $1 \times 10^3$ ohm×cm and $9 \times 10^{16}$ ohm×cm, preferably between $1 \times 10^5$ ohm×cm and $9 \times 10^{13}$ ohm×cm; and a thermal stability, determined by differential thermal analysis with a constant heating rate of 3 K/min, of greater than 200° C.

As colorless and readily dispersible charge control agents, the cyclodextrin-borate complexes of the invention are particularly suitable for color toners in combination with colorants. Suitable colorants in this context are inorganic pigments, organic dyes, organic color pigments, and also white colorants, such as $TiO_2$ or $BaSO_4$, pearl luster pigments and black pigments, based on carbon black or iron oxides.

The invention therefore also provides for the use of the aforementioned cyclodextrin-borate complexes as charge control agents and charge improvers in electrophotographic toners and developers, in triboelectrically or electrokinetically sprayable powders and powder coatings, and in electret materials.

The compounds of the invention are incorporated homogeneously, for example by extrusion or kneading, individually or in combination with one another in a concentration of from 0.01 to 50% by weight, preferably from 0.5 to 20% by weight and, with particular preference, from 0.1 to 5.0% by weight, based on the overall mixture, into the binder of the respective toner, developer, coating material, powder coating, electret material or of the polymer which is to be electrostatically separated. In this context the compounds employed in accordance with the invention can be added as dried and milled powders, dispersions or solutions, presscakes, masterbatches, preparations, made-up pastes, as compounds supplied from aqueous or nonaqueous solution to appropriate carriers such as silica gel, $TiO_2$ or $Al_2O_3$, for example, or in some other form. Similarly, the compounds used in accordance with the invention can also in principle be added even during the preparation of the respective binders, i.e. in the course of their addition polymerization, polyaddition or polycondensation.

The present invention additionally provides an electrophotographic toner, powder or powder coating comprising a customary binder, for example an acrylic or polyester resin containing epoxide, carboxyl and hydroxyl groups, or a combination of such resins, and from 0.01 to 50% by weight, preferably from 0.5 to 20% by weight and, with particular preference, from 0.1 to 5% by weight, based in each case on the overall weight of the electrophotographic toner, powder or powder coating, of at least one of the aforementioned cyclodextrin-borate compounds.

In the case of processes for the electrostatic separation of polymers and, in particular, of (salt) minerals the compounds of the invention can also be applied, in the abovementioned quantities, externally, i.e. to the surface of the material to be separated.

The compounds of the invention can also be employed in inkjet inks, for example as electroconductive agents on the basis of their conductivity and solubility, especially in aqueous systems.

PREPARATION EXAMPLES

Preparation Example 1

1 mol (1135 g) of β-cyclodextrin (7 cyclically linked glucose units) is charged at room temperature to 1600 ml of deionized water, and 200 g of NaOH are added with stirring. The temperature rises immediately to about 45° C. and the pH from 7.7 to 12.8. 2 mol (123.7 g) of orthoboric acid are introduced into the whitish yellow solution, whereupon the pH falls to 12.5. After 20 minutes a clear solution is obtained which is cooled to about 12° C. and introduced into 8l of methanol. There is spontaneous formation of a white, predominantly finely dispersed precipitate, which after 15 minutes is filtered off by suction. Alternatively, the product can be obtained by spray drying. The solid product is washed with methanol and dried in vacuo at about 50° C./150 mbar.

Yield: 1073 g of product; Water content: 6.5% in accordance with Karl Fischer; DTA: decomposition maximum: 313° C.; Elemental analysis: 0.3% boron content; $d_{50}$:36 µm; Crystallinity: highly crystalline, sharp reflections between 20 and 40 (2 theta); specific resistance: $1 \times 10^7$ Ω·cm; BET surface area: 4.0 m$^2$/g; pH after dissolving: 11.9 ; Conductivity: 5.37 mS/cm; UV absorption: 266 nm (H$_2$O).

Preparation Example 2

0.01 mol (9.72 g) of α-cyclodextrin (6 cyclically linked glycose units) are suspended in 100 ml of deionized water, 128 g of saturated sodium carbonate solution are added to establish basic conditions, and the mixture is heated to 70° C. and reacted with 0.1 mol (6.2 g) of orthoboric acid. Stirring is continued for 30 minutes and then the reaction mixture is cooled, concentrated and freed from its residual water at 80° C. in vacuo.

DTA: decomposition at 258° C.; Comparison: boric acid melting point 178° C.; α-Cyclodextrin: m.p. 213.9° C., decomposition 271° C.:

Preparation Example 3

The procedure of Preparation Example 2 is followed using 0.01 mol (12.97 g) of γ-cyclodextrin (8 cyclically linked glucose units).

DTA: 250° C. maximum decomposition; Comparison: boric acid melting point 178° C.; Comparison: γ-cyclodextrin: m.p. 165° C., decomposition 272° C.

Preparation Example 4

For isolation by spray drying, 500 g of a reaction solution from Preparation Example 1, 2 or 3 are dried, before precipitation or other drying, in a conventional spray dryer at an entry temperature of between 100 and 250° C., preferably between 150° C. and 230° C., and an exit temperature of from 50 to 150° C., preferably from 80 to 130° C. The water content is between 10 and 20%, so that it may be necessary to carry out subsequent drying in vacuo. In the following Use Examples, "Compound 1" means the α-cyclodextrin-borate compound from Preparation Example 2;

"Compound 2" means the βcyclodextrin-borate compound from Preparation Example 1;

"Compound 3" means the γ-cyclodextrin-borate compound from Preparation Example 3.

Use Examples

In the following Use Examples the following toner binders and carriers are employed:

Toner binders:
Resin 1: 60:40 styrene-methacrylate copolymer
Resin 2: Bisphenol-based polyester
Carriers:
Carrier 1: 90:10 styrene-methacrylate copolymer-coated magnetite particles of size 50 to 200 µm (bulk density 2.62 g/cm$^3$) (FBM 100 A; from Powder Techn.).
Carrier 2: Silicone-coated magnetite particles of size 50 to 100 µm (bulk density 2.75 g/cm$^3$) (FBM 96-110; from Powder Techn.)

Table 1 below gives an overview of the "compounds" employed in the Use Examples, their concentrations, the resin and the carrier.

TABLE 1

| Use Example | "Compound" | Concentration of "compound" | Colorant [5%] | Resin | Carrier |
|---|---|---|---|---|---|
| 1 | 2 | 0.5% | — | 1 | 1 |
| 2 | 2 | 1.0% | — | 1 | 1 |
| 3 | 2 | 2.0% | — | 1 | 1 |
| 4 | 2 | 3.0% | — | 1 | 1 |
| 5 (Comparative) | — | — | — | 1 | 1 |
| 6 | 2 | 0.5% | — | 2 | 2 |
| 7 | 2 | 1.0% | — | 2 | 2 |
| 8 | 2 | 2.0% | — | 2 | 2 |
| 9 | 2 | 3.0% | — | 2 | 2 |
| 10 (Comparative) | — | — | — | 2 | 2 |
| 11 (Comparative) | — | 0% | P.R. 122+ | 2 | 2 |
| 12 | 2 | 1.0% | P.R. 122+ | 2 | 2 |
| 13 (Comparative) | — | 0.0% | P.Y. 180++ | 2 | 2 |
| 14 | 2 | 1.0% | P.Y. 180++ | 2 | 2 |
| 15 | 1 | 1.0% | — | 1 | 1 |
| 16 | 3 | 1.0% | — | 1 | 1 |
| Comparative Examples | Cyclodextrin: | | | | |
| 1 | α | 1.0% | — | 1 | 1 |
| 2 | β | 1.0% | — | 1 | 1 |
| 3 | γ | 1.0% | — | 1 | 1 |

+C.I. Pigment Red 122 (C.I. No. 73 915)
++C.I. Pigment Yellow 180 (C.I. No. 21290)

Use Example 1

0.5 part of "Compound 2" is incorporated homogeneously over the course of 45 minutes, using a kneader, into 99 parts of a toner binder (60:40 styrene-methacrylate copolymer, resin 1, ®Dialac S 309). The composition is then milled on a laboratory universal mill and subsequently classified in a centrifugal classifier. The desired particle fraction (4 to 25 µm) is activated with a carrier (Carrier 1) consisting of styrene-methacrylate copolymer-coated magnetite particles of size 50 to 200 µm (bulk density 2.62 g/cm$^3$) (FBM 100 A; from Powder Techn.).

Electrostatic testing:

Measurement is carried out on a customary q/m measurement stand. By using a sieve having a mesh size of 50 µm it is ensured that no carrier is entrained when the toner is blown out. Measurements are carried out at 50% relative atmospheric humidity. The q/m values [µC/g] are measured as a function of the activation time.

Use Examples 2 to 4, 15 and 16 are performed analogously, the respective "compound" and its concentration being stated in Table 1.

Use Example 5 (Comparative)

For measurement using the pure styrene-acrylate toner binder (60:40 styrene-methacrylate copolymer, resin 1) the procedure of Use Example 1 is followed but without incorporating additives (resin blank value). The toner binder is activated with a carrier which consists of styrene-methacrylate copolymer-coated magnetite particles of size 50 to 200 µm (bulk density 2.62 g/cm$^3$) (FBM 100 A; from Powder Techn.).

Use Example 6

0.5 part of "Compound 2" is incorporated homogeneously over the course of 45 minutes, using a kneader, into 99 parts of a toner binder (polyester, resin 2, ®Almacryl T500). The composition is then milled on a laboratory universal mill and subsequently classified in a centrifugal classifier. The desired particle fraction (4 to 25 μm) is activated with a carrier (Carrier 2) consisting of silicone-coated ferrite particles of size 50 to 100 μm (FBM 96-110 from Powder Techn.).

Electrostatic testing is carried out as described in Use Example 1.

Use Examples 7 to 9 are carried out similarly (cf. Table 1).

Use Example 10 (Comparative)

The preparation is as in Use Example 5 using resin 2 instead of resin 1 and carrying out activation with carrier 2.

Use Example 11 (Comparative)

The toner is prepared by incorporating 5 parts of the organic color pigment C.I. Pigment Red 122 homogeneously into 95 parts of the polyester toner binder (resin 2) and carrying out measurement following activation with carrier 2.

Use Example 12

The toner is prepared analogously by incorporating 5 parts of color pigment and 1 part of "Compound 2" into 94 parts of toner binder (resin 2) and carrying out measurement following activation with carrier 2.

Use Example 13 (Comparative)

Preparation is as in Use Example 11 but using C.I. Pigment Yellow 180 instead of C.I. Pigment Red 122.

Use Example 14

Preparation is as in Use Example 12 but using C.I. Pigment Yellow 180 instead of C.I. Pigment Red 122.

Comparative Examples 1 to 3

Preparation and measurement are as in Use Example 2, with α-, β- or γ-cyclodextrin being incorporated homogeneously instead of a "Compound" of the invention.

The results of the electrostatic tests are summarized in Table 2 as q/m values [μC/g] determined as a function of time: "min" denotes "minutes" and "h" denotes "hours" of activation time; atmospheric humidity 40 to 60%.

TABLE 2

| Use Example | 10 min | 30 min | 2 h | 24 h |
| --- | --- | --- | --- | --- |
| Styrene-acrylate resin | | | | |
| 1 | −5 | −8 | −14 | −28 |
| 2 | −7 | −10 | −20 | −34 |
| 3 | −8 | −13 | −21 | −36 |
| 4 | −15 | −29 | −39 | −46 |
| 5 (Comparative) | −7 | −11 | −16 | −22 |
| Polyester resin | | | | |
| 6 | −22 | −24 | −25 | −24 |
| 7 | −22 | −24 | −25 | −24 |
| 8 | −22 | −25 | −26 | −26 |
| 9 | −25 | −28 | −32 | −32 |
| 10 (Comparative) | −14 | −14 | −14 | −9 |
| 11 (Comparative) | +1 | +3 | +1 | 0 |
| 12 | −12 | −12 | −10 | −10 |
| 13 (Comparative) | −6 | −6 | −9 | −9 |
| 14 | −13 | −13 | −12 | −13 |
| Styrene-acrylate resin | | | | |
| 15 | −12 | −17 | −16 | −10 |
| 16 | −14 | −20 | −30 | −40 |
| Comparative Example | | | | |
| 1 | −13 | −18 | −21 | −25 |
| 2 | −11 | −19 | −22 | −25 |
| 3 | −10 | −15 | −18 | −20 |

The results in Table 2 demonstrate the high efficiency of the "Compounds" of the invention. Use Examples 5 and 10 show the binder systems without addition of a "compound". The addition in accordance with the invention surprisingly brings about, even in small amounts (0.5%), a significant triboelectric influence. With styrene-acrylate resins as toner binders it is found that owing to the concentration of the added "compound" a defined charge level can be established. In order to obtain a high (negative) charge level, the concentration of the added "compound" can be increased and/or the activation time prolonged (Use Examples 1 to 4).

In the case of polyester resins as toner binders, as are used predominantly for color toners, there is on the one hand rapid charging to a high (negative) charge level even at low concentrations of the added "compound" and secondly an outstanding constancy of this charge level in the case of prolonged activation times (Use Examples 6 to 9).

Use Examples 11 and 13 show a typical magenta pigment (P.R. 122) and a typical yellow pigment (P.Y. 180) without the addition of a "compound"; in other words, colorants often show pronounced inherent charging. Just 1% of the added "compound" keeps the inherent triboelectric charging of the colorant at a constant level, which is then independent of the colorant used.

What is claimed is:

1. An electrophotographic toner or powder coating comprising a binder and from 0.01 to 50% by weight, based on the overall weight, of at least one cyclodextrin-borate complex consisting of from 1 to 4 cyclodextrin units and one borate radical of the formula (I):

wherein said powder coating comprises a powder and wherein said complex is dispersed in the binder of the toner or in the binder of the powder of the powder coating.

2. The electrophotographic toner or powder coating as claimed in claim 1, wherein from 0.5 to 20% by weight, based on the overall weight, of at least one cyclodextrin-borate complex is present.

3. The electrophotographic toner or powder coating as claimed in claim 1, wherein the cyclodextrin of said cyclodextrin-borate complex is α-cyclodextrin, β-cyclodextrin, γ-cyclodextrin, methyl-α-cyclodextrin, methyl-β-cyclodextrin, methyl-γ-cyclodextrin, acetyl-β-cyclodextrin or acetyl-γ-cyclodextrin.

4. The electrophotographic toner or powder coating as claimed in claim 1, wherein the cyclodextrin-borate complex has 1 or 2 cyclodextrin units present.

5. The electrophotographic toner or powder coating as claimed in claim 1, wherein the cyclodextrin-borate complex has a boron content, as determined by elemental analysis, between 0.1 and 5% by weight.

6. A process for preparing an electrophotographic toner comprising dispersing at least one cyclodextrin-borate complex consisting of from 1 to 4 cyclodextrin units and one borate radical of the formula (I):

in a concentration of from 0.01 to 50% by weight based on the overall weight, into a binder to form a mixture, and milling the mixture.

7. The process as claimed in claim 6, wherein the cyclodextrin-borate complex is dispersed in a concentration of from 0.5 to 20% by weight based on the overall weight.

* * * * *